United States Patent
Tarumi et al.

[11] Patent Number: 5,324,691
[45] Date of Patent: Jun. 28, 1994

[54] GLASS COMPOSITION

[75] Inventors: Takashi Tarumi, Kawachinagano; Toshihiko Einishi, Ikoma, both of Japan

[73] Assignee: Isuzu Glass Co., Ltd., Osaki, Japan

[21] Appl. No.: 919,438

[22] Filed: Jul. 27, 1992

Related U.S. Application Data

[63] Continuation-in-part of Ser. No. 680,965, Apr. 5, 1991.

[30] Foreign Application Priority Data

| Apr. 10, 1990 | [JP] | Japan | 2-95917 |
| Aug. 20, 1990 | [JP] | Japan | 2-219630 |
| Mar. 4, 1991 | [JP] | Japan | 3-123243 |

[51] Int. Cl.$^5$ ............................................. C03C 3/112
[52] U.S. Cl. ........................................ 501/66; 501/56; 501/57; 501/58; 501/59; 501/67; 501/69; 501/72; 501/73
[58] Field of Search .............. 501/13, 56, 57, 58, 501/59, 66, 67, 69, 72, 73

[56] References Cited

U.S. PATENT DOCUMENTS

| 2,651,145 | 9/1953 | Stookey | 501/56 |
| 3,325,299 | 6/1967 | Arauso | 501/13 |
| 3,954,485 | 5/1976 | Seward, III et al. | 501/13 |
| 4,106,946 | 8/1978 | Ritze | 501/70 |
| 4,222,781 | 9/1980 | Morse et al. | 501/13 |
| 4,297,142 | 10/1981 | Ritze | 501/78 |
| 4,303,298 | 12/1981 | Yamashita | 501/73 |
| 4,374,931 | 2/1983 | Courbin et al. | 501/56 |
| 4,556,605 | 12/1985 | Mogami et al. | 488/331 |
| 5,024,974 | 6/1991 | Nakamura et al. | 501/13 |

FOREIGN PATENT DOCUMENTS

| 321297 | 6/1971 | European Pat. Off. |
| 353834 | 2/1990 | European Pat. Off. ........ C03C 3/06 |
| 46-3464 | 1/1971 | Japan. |
| 1089067 | 4/1984 | U.S.S.R. |

OTHER PUBLICATIONS

Stanworth, Journal of the Society of Glass Technology, vol. 25, pp. 95–99 (1941).
Weyl, Coloured Glasses, pp. 433–435 (1951).
Skoog and West, "Fundamentals of Analytical Chemistry", (2d ed. 1969) pp. 634 and 640.

Primary Examiner—Karl Group
Assistant Examiner—C. M. Bonner
Attorney, Agent, or Firm—Armstrong, Westerman, Hattori, McLeland & Naughton

[57] ABSTRACT

The invention provides: a glass composition comprising about 20 to about 85% of $SiO_2$, about 2 to about 75% of $B_2O_3$, about 15% or less of $Al_2O_3$, about 30% or less of at least one of $Li_2O$, $Na_2O$, $K_2O$, $Rb_2O$ and $Cs_2O$, about 0.1 to about 10% of ZnO, about 10% or less, calculated as total amount in combination with ZnO, of at least one of MgO, CaO, BaO, SrO and PbO, about 10% or less of at least one of $ZrO_2$, $La_2O_3$, $Y_2O_3$, $Ta_2O_3$ and $Gd_2O_3$, and about 0.05 to about 15% of at least one copper halide.

3 Claims, 1 Drawing Sheet

GLASS COMPOSITION

This is a continuation-in-part of application Ser. No. 07/680,965 filed Apr. 5, 1991, now abandoned.

BACKGROUND OF THE INVENTION

The present invention relates to a glass composition for use as a material capable of intercepting ultraviolet radiation.

The percentages (%) appearing herein are all by weight unless otherwise specified.

Colored glass has been used as a material capable of absorbing light beams in ultraviolet or visible region, e.g., as a material for sharp cut glass filters on cameras. Such colored glass is produced by doping a glass material with microcrystals of semiconductor compounds which pertain to II–VI groups such as CdS, CdSe, CdSSe and the like. The microcrystals of semiconductor can intercept ultraviolet radiation by absorbing light beams at a specific wavelength passing through colored glass.

However, the foregoing cadmium compounds are toxic and cause health hazards to operators carrying out a producing process including preparation of a batch, transport, melting, etc. Moreover, it is difficult to dispose of the Cd compounds in the effluents and waste resulting from cutting, grinding, polishing and other processing, and consequently pollution problems are likely to occur. To avoid pollution, the contents of Cd and like compounds in waste water are limited, for example, to 0.1 mg/l under the Water Pollution Control Law in Japan. For the above reasons, the production of colored glass requires a number of installations including equipment for treatment to control pollution, equipment for the disposal of sludge, etc. and therefore the Cd compound-doped glass is not an industrially suitable material.

The glass materials doped with microcrystals of CdS, CdSe, CdSSe or like compounds show a gradual inclination in a graph ($\Delta\lambda$) according to JIS B 7113 indicating the light transmittance plotted as ordinate and the wavelength plotted as abscissa and can not achieve a high absorption of light.

Multilayer-coated glass is used for similar applications. This type of glass is produced by vapor deposition of multilayer film on a glass product incapable of absorbing light beams in ultraviolet or visible region and is intended to intercept light beams in a specific wavelength range by utilizing the interference of light beams in between the multilayers. Multilayer-coated glass, however, has an intercepting effect which depends on the angle of incidence. More specifically multilayer-coated glass is capable of intercepting light beams of specific wavelength which are incident in a specific direction, but is incapable of shutting off light beams which are incident in other directions. In addition, multilayer-coated glass shows a gradual inclination in the graph under JIS B 7113 and can not give a high intercepting effect.

SUMMARY OF THE INVENTION

We conducted extensive research to prepare from glass a novel ultraviolet light-intercepting material having a higher effect without use of Cd compounds and other harmful substances which entail the foregoing problems in producing colored glass. Our research revealed that a glass composition, which is prepared by doping a glass material with microcrystals of copper halides, i.e. semiconductor compounds of I–VII groups and which contains a specific amount of ZnO, can substantially completely intercept the light beams of wavelengths not longer than a specific wavelength, permits the light beams of longer wavelength to pass therethrough, shows a sharp inclination in the graph under JIS B 7113 and has an excellent absorbing characteristic. Furthermore, we found that when intensively irradiated with UV beams, the glass composition can retain the inherent light transmitting characteristic. The present invention has been accomplished based on this novel finding.

According to the present invention, there is provided: a glass composition comprising about 20 to about 85% of $SiO_2$, about 2 to about 75% of $B_2O_3$, about 15% or less of $Al_2O_3$, about 30% or less of at least one of $Li_2O$, $Na_2O$, $K_2O$, $Rb_2O$ and $Cs_2O$, about 0.1 to about 10% of ZnO, about 10% or less, calculated as total amount in combination with ZnO, of at least one of MgO, CaO, BaO, SrO and PbO, about 10% or less of at least one of $ZrO_2$, $La_2O_3$, $Y_2O_3$, $Ta_2O_3$ and $Gd_2O_3$, and about 0.05 to about 15% of at least one copper halide.

The glass composition of the present invention which is produced by doping a mixture of specific glass components with microcrystals of at least one copper halide allows the selective passage of light beams at a specific wavelength range therethrough and can achieve the desired effect due to coloring. Even when irradiated with UV, visible or near-infrared light beams, particularly even when irradiated with the intensive ultraviolet light from a light source such as a metal halide lamp, the glass composition of the invention does not undergo the change of light transmitting characteristic and can retain the inherent light transmitting characteristic.

BRIEF DESCRIPTION OF THE DRAWINGS

In the accompanying drawing.

DETAILED DESCRIPTION OF THE INVENTION

Figure 1:
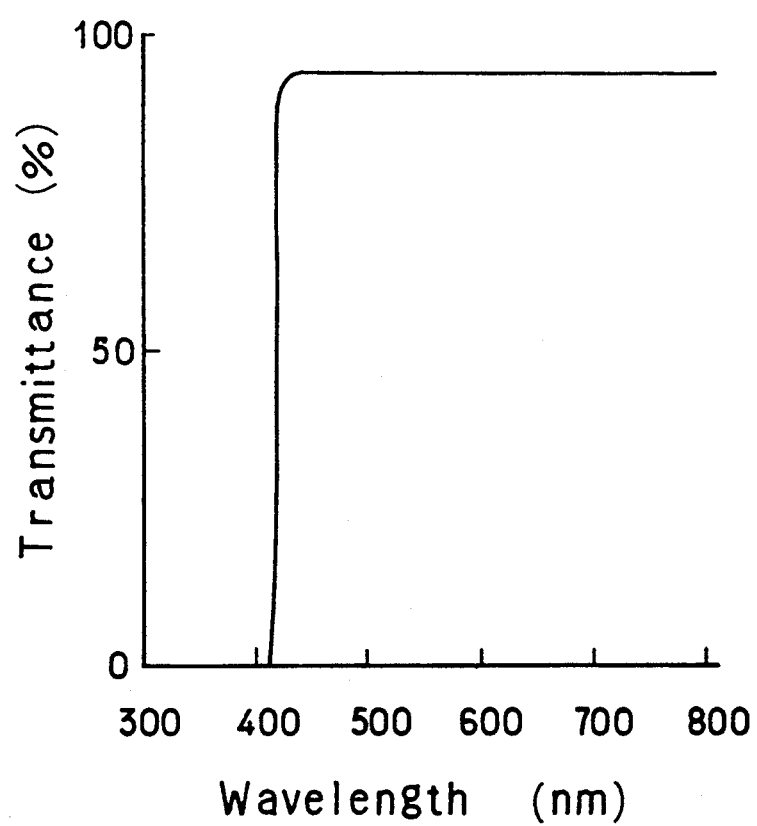
FIG. 1 is a graph showing the light transmitting characteristic of the glass composition of the present invention.

Among the components of glass composition of the invention, the components other than the copper halides constituting the major feature of the invention are selected from the compounds heretofore employed for conventional glass products.

Stated more specifically, in preparation of the glass composition of the present invention, the components other than the copper halides are selected from the following compounds heretofore used as glass components and combined in a specific ratio:

$SiO_2$, $B_2O_3$, $Al_2O_3$, $Li_2O$, $Na_2O$, $K_2O$, $Rb_2O$, $Cs_2O$, MgO, CaO, ZnO, BaO, SrO, PbO, $ZrO_2$, $La_2O_3$, $Y_2O_3$, $Ta_2O_3$ and $Gd_2O_3$.

As a matter of course, the components in a multicomponent composition affect each other to achieve the properties. Therefore the discussion of quantity range of each component in a multi-component composition may not necessarily be meaningful. None the less, we discuss below the reasons for determining the amounts of components as specified above in the glass composition of the present invention.

Among the components of the glass composition of the invention, $SiO_2$ is a main component for forming the network and accounts for about 20 to about 85%, preferably about 50 to about 71%, of the total components. The proportion of $SiO_2$ outside the above range is undesirable because the content of more than 85% impairs the fusing property of glass, whereas the content of less than 20% imparts a poor chemical resistance which may give rise to change of color.

$B_2O_3$ serves to enhance the fusing property of glass, and can assist in the formation of glass-network in a certain composition. This component accounts for about 2 to about 75%, preferably about 12 to about 27%, of the total components. The content of more than 75% reduces the chemical resistance of glass, whereas the content of less than 2% gives a poor light transmittance and a deteriorated fusing property to glass.

$Al_2O_3$ inhibits devitrification and improves the chemical resistance of glass. The compound accounts for about 15% or less, preferably about 1 to about 10%, of the total components. The content of more than 15% pronouncedly decreases the fusing property of glass.

$LiO_2O$, $Na_2O$, $K_2O$, $Rb_2O$ and $Cs_2O$ enhance the fusing property of glass. They are usable singly or at least two of them can be used in mixture. The amount is about 30% or less, preferably about 5 to about 15%, based on the total components. The content of more than 30% lowers the chemical resistance of glass.

ZnO improves the chemical resistance of glass. In addition, the glass composition containing ZnO does not undergo the change of light transmitting characteristic, even when intensively irradiated with UV beams. The content of ZnO is about 0.1 to about 10%, preferably about 0.5 to about 4%, based on the total components.

Copper halides useful in the invention include, for example, CuCl, CuBr, CuI, etc. At least one of these halides is used for doping the glass. The copper halides act as a coloring agent which absorbs light beams of a specific wavelength in ultraviolet or visible region. The copper halide is used in an amount of about 0.05 to about 15%, preferably about 0.3 to about 8%, based on the total components. The glass composition containing the copper halide in said quantity range can substantially completely intercept light beams of wavelengths not longer than a specific wavelength within the range of about 350 to about 450 nm, permits light beams of longer wavelength to substantially completely pass therethrough, and shows a sharp inclination in the graph under JIS B 7113 and an outstanding light transmitting characteristic. The content of copper halide outside the foregoing range is undesirable because the content of less than 0.05% fails to achieve the foregoing desired effect, whereas the content of more than 15% causes devitrification.

When required, at least one of MgO, CaO, BaO, SrO and PbO can be used. They improve the chemical resistance of glass. They are used in such an amount that the total amount in combination with ZnO is about 10% or less, preferabley about 5% or less, more preferably about 0.2 to about 5%, based on the total components.

When required, at least one of $ZrO_2$, $La_2O_3$, $Y_2O_3$, $Ta_2O_3$ and $Gd_2O_3$ can be used. They enhance the chemical resistance of glass. The amount is about 10% or less, preferably about 0.1% to about 5%, based on the total components. The content of more than 10% induces increased devitrification, thereby adversely affecting the stability of glass.

The glass composition of the present invention can be used for the following specific applications.

(1) Material for masking in an apparatus for curing ultraviolet-curing resins

A ultraviolet-curing resin is cured by irradiation with high-energy ultraviolet beams from a light source such as a high pressure mercury lamp, a metal halide lamp or the like. High-energy ultraviolet radiation which is indispensable to cure UV-curing resins is undesirable in terms of assured safety of operators, prevention of deterioration of equipment, etc. The UV-intercepting material of the present invention is useful, for example, as materials for glass plates in a monitoring window provided in a resin-curing apparatus, as materials for glass plates for protection of parts of such apparatus against degradation, as materials for glass plates adapted to selectively pass UV beams radiated from a light source at a wavelength suited for curing a specific resin while shutting off UV beams at a wavelength outside the range.

The glass plate composed of UV-intercepting material of the invention has preferably the following composition:

about 55 to about 75% of $SiO_2$, about 12 to about 30% of $B_2O_3$, about 1 to about 10% of $Al_2O_3$, about 5 to about 15% of at least one of $Li_2O$, $Na_2O$, $K_2O$, $Rb_2O$ and $Cs_2O$, about 0.5 to about 5% of ZnO, about 5% or less, caluculated as total amount in combination with ZnO, of at least one of MgO, CaO, BaO, SrO and PbO, about 5% or less of at least one of $ZrO_2$, $La_2O_3$, $Y_2O_3$, $Ta_2O_3$ and $Gd_2O_3$, and about 0.3 to about 8% of at least one copper halide.

(2) Glass product for protection of artistic handicrafts, etc.

Float glass has been used, for example, for show windows and display stands in artistic handicraft stores, quality clothes stores, etc. and as windowpanes in laboratories, automobiles and so on. However, float glass is unable to intercept UV beams in the sunlight, and therefore fail to prevent the color fading and degradation of artistic handicrafts, the discoloration and deterioration of clothes, the adverse influence on research results, the quality change and impairments of interior parts in automobiles, etc. Furthermore, the float glass used in automobiles is problematic in that drivers-in automobiles are susceptible to eye disorders due to ultraviolet radiation and dermatitis due to sunburn.

The UV-intercepting material of the invention effectively interrupts UV beams in the sunlight and permits visible radiation to selectively pass therethrough, as described above. Consequently the UV-intercepting material of the invention can alleviate or obviate the foregoing problems, and is useful as glass material for protecting articles in a wide range of fields.

The glass product for the above applications has preferably the same composition as described above in (1).

(3) Material for optical filters or for spectacle lenses

Optical glass filters have been used for optical instruments such as cameras. Currently there is a demand for novel materials for filters which can interrupt UV radiation more effectively to form a sharper image.

Similarly in the art of spectacles, a demand exists for materials which can intercept UV radiation sufficiently to protect the eyes with a higher effect.

The UV-intercepting material of the invention, which can effectively intercept ultraviolet beams and allows the selective passage of visible radiation therethrough, is suitable as materials for optical glass filters and for spectacle lenses.

It is more preferred that the material for optical glass filters and for spectacle lenses according to the present invention has the same composition as described above in (1).

(4) Material for containers

Since pharmaceutical preparations, alcohols, beverages, etc. tend to undergo the change of properties by exposure to UV radiation, they are frequently accommodated in containers of colored glass (such as brown glass or emerald green glass). However, conventional colored glass adapted to fully interrupt UV radiation notably shuts off visible radiation, thereby making it difficult to mechanically or visually inspect the contents of the container.

Because of their ability to effectively intercept UV radiation while permitting selective passage of visible radiation therethrough, the UV-intercepting material of the invention is suitable as materials for containers intended to hold the contents which require inspection.

According to B-155-5 (method of testing glass containers for injectable preparations) in Japanese Pharmacopoeia, the containers are required to have a light transmittance of 50% or less at a wavelength of 290 to 450 nm or 60% or more at 590 to 610 nm as determined by the method of testing containers of colored glass for the light barrier property. The UV-intercepting material of the invention can fully meet the requirements.

The material for containers in this technical area has preferably the following composition:

about 60 to about 77% of $SiO_2$, about 10 to about 20% of $B_2O_3$, about 1 to about 12% of $Al_2O_3$, about 5 to about 10% of at least one of $Li_2O$, $Na_2O$, $K_2O$, $Rb_2O$ and $Cs_2O$, about 0.5 to about 8% of ZnO, about 8% or less, caluculated as total amount in combination with ZnO, of at least one of MgO, CaO, BaO, SrO and PbO, about 8% or less of at least one of $ZrO_2$, $La_2O_3$, $Y_2O_3$, $T_2O_3$ and $Gd_2O_3$, and about 0.3 to about 8% of at least one copper halide.

(5) Powdery material for UV absorption

The UV-intercepting material of the invention capable of effectively intercepting UV radiation may be incorporated in the form of particles of about 1 to about 10 μm in size into a resin composition, a coating composition or the like to improve the weatherability and color-fading resistance of the composition.

The colored glass product according to the invention can be produced using the glass composition of the invention and conducting a conventional method for producing colored glass product. For example, the method is carried out by weighing the components to achieve the specified composition, mixing together the components, melting the mixture at a temperature of about 1200° to about 1500° C., stirring the molten mass, refining the mass, placing the resulting product into a mold, cooling the molded mass or heating the molded mass to about 450° to about 700° C. for about 1 to about 5 hours after cooling, and cutting, polishing and otherwise processing the molded product, whereby the desired glass product is obtained. The microcrystals of copper halide(s) are incorporated into the glass in the method by being mixed with the other components in the form of copper halide or alternatively in the form of a copper compound as the copper source such as copper oxide, copper halide and the like in combination with a halogenated alkali compound as the halogen source for producing a copper halide such as lithium halide, sodium halide, potassium halide, rubidium halide, cesium halide and the like in such a ratio as to achieve the defined composition. Usable as other components than copper halides are conventional glass components including oxides, carbonates, hydroxides and the like which eventually provide the intended composition. It is important to conduct the cooling and heating at a low rate to avoid thermal deformation. More specifically the cooling rate is about 10° to about 100° C./hr, preferably about 30° to about 50° C./hr, and the heating rate is about 10° to about 100° C./hr, preferably about 30° to about 70° C./hr. The size of microcrystals of copper halide is varied depending on the rates and the heating time. It is desirable in the invention to adjust the microcrystals of copper halide to a diameter of about 0.1 to about 10 nm. The melting step is preferably carried out in a neutral or reducing atmosphere to convert Cu ions into Cu$^-$. A refiner such as $As_2O_3$, $Sb_2O_3$ or the like may be used in effecting the refining step. The amount of the refiner is usually about 0.5% or less, preferably about 0.05 to about 0.3%.

The glass composition of the invention has the following remarkable advantages.

(1) The glass material of the invention can substantially completely intercept light beams of wavelengths not longer than a specific wavelength of about 350 to about 450 nm within the range of 250 to 800 nm at which the beams have been irradiated, and substantially completely permits the passage of light beams at longer wavelength. In addition, the glass material shows a sharp inclination in the graph under JIS.B 7113 and thus has an excellent absorbing characteristic.

(2) The glass material which can intercept light beams of wavelengths not longer than a specific wavelength of about 350 to about 450 nm can be produced by controlling the content, the kind, and the combination of copper halides to be incorporated into the glass.

(3) The light transmitting characteristic of the glass material is not varied by irradiation with any of UV, visible and near-infrared light beams. Particularly, even when intensively irradiated with high-energy ultraviolet beams from a light source such as a metal halide lamp or the like, the light transmitting characteristic is not valid and the inherent light transmitting characteristic is retained.

(4) Glass product can be prepared by common glass-producing equipment with safety unlike conventional colored glass, without care heretofore required in handling and disposal nor addition of installations for disposal and the like.

(5) The glass composition of the invention can be melted well and therefore gives a glass product which has a uniform composition and stable properties.

Given below are Examples, Reference Examples and Test Examples to clarify the features of the present invention in greater detail.

EXAMPLE 1

The starting materials as shown below in Table 1 were mixed together in the listed amounts and the mixture was melted in a crucible made of alumina at the temperature as shown in Table 1 for 2 hours. The mixture was poured on a carbon plate and gradually cooled to room temperature, followed by heat treatment at the temperature as shown in Table 1. The product was cut and polished to obtain a glass product.

In the above procedure, the mixture of the starting materials was melted in a neutral or a reduced atmosphere, cooled at a rate of 30° C./hr and heated for the heat treatment at a rate of 50° C./hr.

$Cu_2O$ was used as a copper source and sodium halide or potasium halide as a halogen source.

The mixtures of the listed compositions were melted and molded with ease, and the obtained glass products were all outstanding in chemical resistance. It was confirmed that even when $As_2O_3$ or $Sb_2O_3$ was used as a refiner in an amount of 0.2 to 0.25% in the refining step, the light transmitting characteristic of the obtained glass products was not changed.

TABLE 1

| Components (%) | Glass No. | | | |
| --- | --- | --- | --- | --- |
|  | 1 | 2 | 3 | 4 |
| $SiO_2$ | 61.3 | 59.8 | 61.3 | 55.3 |
| $B_2O_3$ | 23.3 | 23.9 | 23.9 | 23.8 |
| $Al_2O_3$ | 3.2 | 3.2 | 3.3 | 4.0 |
| $Na_2O$ | 6.9 | 5.1 | 7.8 | — |
| $K_2O$ | — | 3.6 | — | 12.1 |
| ZnO | 3.6 | 3.8 | 2.1 | 1.0 |
| BaO | — | — | — | 1.8 |
| $ZrO_2$ | — | — | 1.0 | — |
| CuCl | 1.7 | — | — | — |
| CuBr | — | 0.6 | 0.6 | — |
| CuI | — | — | — | 2.0 |
| Melting temperature | 1450° C. | 1450° C. | 1450° C. | 1380° C. |
| Heat-treatment temperature | 580° C. | 580° C. | 580° C. | 560° C. |
| Heat-treatment time | 3 hrs. | 3 hrs. | 3 hrs. | 3 hrs. |

Each of the glass products (thickness of 2 mm) obtained in the above procedure was irradiated with ultraviolet light for 10 hours using a 200 W metal halide lamp at a distance of 10 cm to determine a decrease in transmittance in visible region.

The degree of the decrease in transmittance was evaluated by comparing the transmittance after the irradiation with the transmittance before the irradiation. The results are shown in Table 2.

TABLE 2

| glass No. | 1 | 2 | 3 | 4 |
| --- | --- | --- | --- | --- |
| Decrease in transmittance (%) | 0.5 | 0.2 | 0.6 | 0.2 |

Table 2 shows that even when the hight-energy ultraviolet light is irradiated, the decrease in transmittance is very slight.

TEST EXAMPLE

The glass product No. 2 (thickness of 2 mm) obtained in Example 1 was tested for spectral transmitting characteristic by irradiation with light rays at a wavelength of 300 to 800 nm.

FIG. 1 shows that the UV-intercepting material of the present invention effectively intercepts light beams in ultraviolet region and has an excellent absorbing characteristic which is represented as a sharply inclined curve in the graph.

I claim:

1. A glass composition consisting essentially of about 20 to about 85% of $SiO_2$, about 2 to about 75% of $B_2O_3$, and about 15% or less of $Al_2O_3$, about 30% or less of at least one of $Li_2O$, $Na_2O$, $K_2O$, $Rb_2O$ and $Cs_2O$, about 0.1 to about 10% of ZnO, about 10% or less, calculated as total amount in combination with ZnO, of at least one of MgO, CaO, BaO, SrO and PbO, about 10% or less of at least one of $ZrO_2$, $La_2O_3$, $Y_2O_3$, $Ta_2O_3$ and $Gd_2O_3$, and about 0.05 to about 15% of at least one copper halide selected from the group consisting of CuCl, CuBr and CuI, wherein all percentages are based on the weight of the composition and wherein said glass composition retains its inherent light transmitting characteristics after UV irradiation.

2. A glass composition according to claim 1 which consists essentially of about 50 to 71% of $SiO_2$, about 12 to about 27% of $B_2O_3$, about 1 to about 10% of $Al_2O_3$, about 5 to about 15% of at least one of $Li_2O$, $Na_2O$, $K_2O$, $Rb_2O$ and $Cs_2O$, about 0.5% to about 4% of ZnO, about 5% or less, calculated as total amount in combination with ZnO, of at least one of MgO, CaO, BaO, SrO and PbO, about 0.1 to about 5% of at least one of $ZrO_2$, $La_2O_3$, $Y_2O_3$, $Ta_2O_3$ and $Gd_2O_3$, and about 0.3 to about 8% of at least one copper halide selected from the group consisting of CuCl, CuBr and CuI, wherein all percentages are based on the weight of the composition.

3. A process for selectively absorbing ultraviolet radiation, comprising
(i) providing a glass composition according to claim 1 between an object sensitive to ultraviolet radiation and a light source which radiates light having wavelengths within the range of from 250 to 800 nm;
(ii) intercepting light beams at less than a characteristic wavelength within the range of 350 to 450 nm; and
(iii) permitting light beams longer than said wavelength to pass through said glass composition and impinge upon said object.

* * * * *